Jan. 13, 1970 TAKESHI HARA ET AL 3,489,260

PLANAR RECIPROCATION TYPE ESCALATOR

Filed Aug. 29, 1967 10 Sheets-Sheet 1

INVENTORS

TAKESHI HARA, KATSUYA TERANISHI, MAMORU WATANABE, KEN ICHIRYU, MITSUAKI TAKENOSHITA

BY Craig & Antonelli

ATTORNEYS

PLANAR RECIPROCATION TYPE ESCALATOR

Filed Aug. 29, 1967 10 Sheets-Sheet 2

INVENTORS
TAKESHI HARA, KATSUYA TERANISHI, MAMORU WATANABE, KEN ICHIRYU, MITSUAKI TAKENOSHITA

BY Craig & Antonelli

ATTORNEYS

Jan. 13, 1970 TAKESHI HARA ET AL 3,489,260

PLANAR RECIPROCATION TYPE ESCALATOR

Filed Aug. 29, 1967 10 Sheets-Sheet 3

INVENTORS

TAKESHI HARA, KATSUYA TERANISHI, MAMORU WATANABE, KEN ICHIRYU, MITSUAKI TAKENOSHITA

BY Craig & Antonelli

ATTORNEYS

PLANAR RECIPROCATION TYPE ESCALATOR

Filed Aug. 29, 1967

INVENTORS
TAKESHI HARA, KATSUYA TERANISHI
MAMORU WATANABE, IKEN ICHIRYO,
MITSUAKI TAKENOSHITA

BY Craig & Antonelli
ATTORNEYS

Jan. 13, 1970 TAKESHI HARA ET AL 3,489,260

PLANAR RECIPROCATION TYPE ESCALATOR

Filed Aug. 29, 1967 10 Sheets-Sheet 5

INVENTORS

TAKESHI HARA, KATSUYA TERANISHI, MAMORU WATANABE, KEN ICHIRYU, MITSUAKI TAKENOSHITA

BY Craig & Antonelli

ATTORNEYS

Jan. 13, 1970 TAKESHI HARA ET AL 3,489,260

PLANAR RECIPROCATION TYPE ESCALATOR

Filed Aug. 29, 1967 10 Sheets-Sheet 6

INVENTORS

TAKESHI HARA, KATSUYA TERANISHI,
MAMORU WATANABE, KEN ICHIRYO
MITSUAKI TAKENOSHITA

BY Craig & Antonelli

ATTORNEYS

PLANAR RECIPROCATION TYPE ESCALATOR

Filed Aug. 29, 1967 10 Sheets-Sheet 7

INVENTORS

TAKESHI HARA, KATSUYA TERANISHI,
MAMORU WATANABE, KEN ICHIRYU,
MITSUAKI TAKENOSHITA

BY Craig & Antonelli

ATTORNEYS

INVENTORS

TAKESHI HARA, KATSUYA TERANISHI,
MAMORU WATANABE, KEN ICHIRYU,
MITSUAKI TAKENOSHITA

BY Craig & Antonelli

ATTORNEYS

INVENTORS
TAKESHI HARA, KATSUYA TERANISHI,
MAMORU WATANABE, KEN ICHIRYU
MITSUAKI TAKENOSHITA

BY Craig & Antonelli
ATTORNEYS

INVENTORS
TAKESHI HARA, KATSUYA TERANISHI,
MAMORU WATANABE, KEN ICHIAYO,
MITSUAKI TAKENOSHITA
BY Craig & Antonelli
ATTORNEYS United States Patent Office 3,489,260

Patented Jan. 13, 1970

3,489,260

PLANAR RECIPROCATION TYPE ESCALATOR

Takeshi Hara, Katsuya Teranishi, and Mamoru Watanabe, Katsuta-shi, and Ken Ichiryu and Mitsuaki Takenoshita, Hitachi-shi, Japan, assignors to Hitachi, Ltd., Tokyo, Japan, a corporation of Japan Filed Aug. 29, 1967, Ser. No. 664,198
Claims priority, application Japan, Aug. 31, 1966, 41/57,001; Sept. 16, 1966, 41/60,818; Dec. 28, 1966, 41/85,378, 41/85,379; Jan. 11, 1967, 42/1,767; Jan. 20, 1967, 42/3,591, 42/3,596; June 30, 1967, 42/41,548
Int. Cl. B66d 9/12
U.S. Cl. 198—17 24 Claims

ABSTRACT OF THE DISCLOSURE

A planar reciprocation type escalator comprising a series of treadboard elements to be circulated in a circulation path consisting of two parallel rectilinear sloped sections, one for ascending and the other for descending, bridging over adjacent floors in a building and two semicircular horizontal sections connecting said rectilinear sections with each other at the upper and lower ends thereof under the floor boards of the respective floors, said treadboard elements being arranged in adjoining relation to each other in the rectilinear sections of the circulation path with substantially no space between adjacent ones and being shifted from one rectilinear section to another while being held in the same directional position.

The present invention relates to a planar reciprocation type escalator adapted to be installed in department stores or the like buildings, which singly provides an ascending passageway and a descending passageway with common treadboard elements and which therefore eliminates the necessity of installing two separate escalator units each having treadboard elements of its own.

Escalators are generally used as conveyor means for bridging two points which are spaced vertically, e.g., as conveyor means for bridging over adjacent floors in a building such as a department store. In conventional escalators, as is well known, a series of treadboard elements for bridging over adjacent floors are circulated in a vertical plane in a loop of the path. Namely, the treadboard elements are continuously circulated in a path consisting of an upper section providing a passageway from one floor to another and a lower section extending below said upper section for return movement of the treadboard elements, wherein said upper and lower sections of the circulation path are connected with each other under the floor boards of the respective floors.

In other words, the escalators which have commonly been used heretofore, are composed of an upper row of treadboard elements in onward movement providing a passageway for bridging over two spaced points and a lower row of treadboard elements in return movement running below said upper row. Therefore, in order to provide a reciprocatory conveyance concurrently, it has been necessary to install two separate series of treadboard elements travelling in opposite directions in different circulation paths.

The object of the present invention is to provide a planar reciprocation type escalator which singly provides an ascending passageway and a descending passageway, extending rectilinearly and arranged in side-by-side relation, with common treadboard elements circulating from one passageway to another without having their directional positions changed, that is, with the treadboard elements facing the same direction and which therefore eliminates the necessity of providing two separate escalator units as has been practiced in the past.

More specifically, the object of the present invention is to provide a planar reciprocation type escalator which enables an ascending passageway and a descending passageway to be obtained with a single system using common treadboard elements continuously circulating in a substantially annular path while maintaining their directional positions unchanged, whereby it is possible to obtain an ascending escalator and a descending escalator with a single system without causing reversion in directional position of the treadboard elements which would otherwise occur as a result of circulation, said ascending and descending escalators having basically the same operation and appearance as the conventional ascending and descending escalators arranged side-by-side independently of each other.

The foregoing object of the present invention can be attained by a planar reciprocation type escalator which comprises a series of treadboard elements to be circulated in a loop of path, consisting of two parallel rectilinear sloped sections, one for upward conveyance and another for downward conveyance, arranged in side-by-side relation for the communication of adjacent floors in a building, and two semicircular horizontal sections connecting said rectilinear sections with each other at the upper and lower ends thereof under the floor boards of the respective floors, in a manner such that the treadboard elements travel in said rectilinear sections in adjoining relation to each other with substantially no gap between adjacent ones to thereby provide for conveyance of an objective article to a desired point, drive means for driving said series of treadboard elements and directional position control means to maintain the directional position of each of the treadboard elements unchanged as said treadboard element is shifted from one rectilinear section to another.

The most important feature of the present invention resides in the point that the treadboard elements being circulated are shifted from one rectilinear section of the circulation path to another in such a manner that in the rectilinear sections their directional positions are maintained unchanged and, in the rectilinear sections, they travel in adjoining relation to each other with substantially no horizontal gap between adjacent ones.

In other words, since each treadboard element has first and second edges and a riser secured to the second edge, the first edge of each treadboard element in one of the rectilinear sections contacts slidably with the riser of the preceding treadboard element while the first edge of each treadboard element in the other rectilinear section contacts slidably with the riser of the succeeding treadboard element.

According to the present invention, therefore, since the treadboard elements are shifted from one rectilinear section of the circulation path to another during circulation without having their directional positions changed as described, it is possible to avoid reversion in directional position of the treadboard elements between the ascending section and descending section of the path, which would otherwise be inevitable during circulatory operation, and thereby to obtain an ascending escalator and a descending escalator with a single system, which are very simple in construction and have basically the same appearance as the conventional independent escalators. Furthermore, since the treadboard elements are common for both the ascending and descending escalators, there is no need of providing two independent escalator units separately as has been practiced heretofore and as a result the number of treadboard elements required can be reduced to about half. Still further, since according to the present invention no space is required to be provided for return movement of the treadboard elements below the upper section of the circulation path providing an ascending or descending passageway, the width of the escalator in a direction perpendicular to the plane of conveyance (or the dimension A in FIG. 2 to be describe later) can be reduced remarkably as compared with that of the conventional escalator. Still further, since in the present invention the treadboard elements in the ascending section and the descending section of the circulation path travel in opposite directions, the loads of the rows of treadboard elements in said sections act on a prime mover in offsetting directions, so that the drive of the prime mover can be utilized efficiently.

The object and advantages set forth above, and other particularities of the present invention, will become apparent from the following detailed description on preferred embodiments of the invention illustrated in the accompanying drawings.

FIG. 1 to FIG. 12 inclusive show one preferred embodiment of the planar reciprocation type escalator according to the present invention, in which:

FIG. 13 to FIG. 19 inclusive show another preferred embodiment of the planar reciprocation type escalator according to the present invention, in which:

FIG. 13 is a top plan view with a portion broken away;

FIG. 14 is a side view, in cross section, of FIG. 13;

FIG. 15 is a plan view showing a driving system for the treadboard elements;

FIG. 16 is a fragmentary plan view showing the detail of treadboard element shifting means;

FIG. 17 is a perspective view of the treadboard element to be used in this embodiment;

FIG. 18 is a view of the treadboard element as viewed in the direction of the arrow in FIG. 18; and FIG. 19 is a side view of FIG. 18.

In the first embodiment, shown in FIGS. 1 to 12, a treadboard element circulation path 1 consists of rectilinear sloped sections 2, 2' extending from one floor to another in a building in parallel relation, and semicircular horizontal sections 3, 3' connecting said rectilinear sections with each other at both ends thereof, and a series of treadboard elements 4 are arranged to travel in the circulation path above described.

Figure 1:
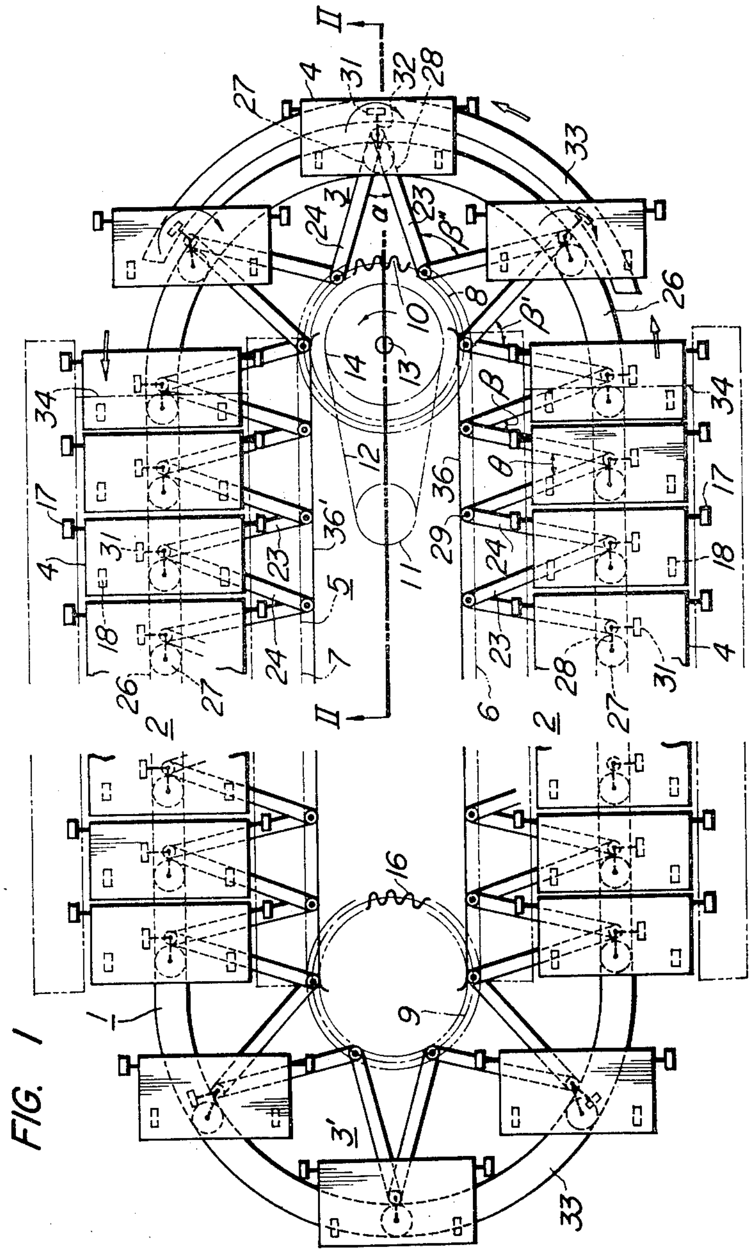
FIG. 1 is an overall top plan view o fthe planar reciprocation type escalator.

Inside of the circulation path 1 is arranged along therewith a loop of drive chain 5 which is circulated in a path consisting of an ascending rectilinear section 6, a descending rectilinear section 7 and semicircular sections 8, 9 connecting said rectilinear sections with each other at the upper and lower horizontal terminal end portions of the escalator. This drive chain 5 is engaged around a driving sprocket 10 at the upper horizontal portion 3 and a driven sprocket 16 at the lower horizontal portion 3'. Each of the treadboard elements 4 is connected to the drive chain 5 in the manner shown in FIGS. 3 and 5. Namely, the drive chain 5 carries pairs of levers 40*a*, 41*a*; 40*b*, 41*b* . . . fixedly mounted thereon. Arms 23 and 24 have one end pivotally connected to the arms 40*b*, 41*a* respectively by a pin 29. The other end of the arm 23 is mounted through a spherical bearing 25 on a rod 22, extending vertically downwardly from the underside of each treadboard element 4, and the other end of the arm 24 is pivotally connected to the arm 23 by a pin. The arms 23, 24 are pivotally connected with each other by means of the pin as described, for the purpose of rendering the angle $\theta$, formed by said arms, variable in accordance with the rectilinear distance between the adjacent levers 40*b* and 41*a* varying as said levers move from the rectilinear section to the semicircular section or vice versa, of the path of the chain. The pivotal connection between the arms 23, 24 also provides for variation of the angle $\beta$, formed by the arms of adjacent treadboard elements, to $\beta'$, $\beta''$ . . . as shown in FIG. 1, as the chain proceeds from the rectilinear section to the horizontal section, whereby collision of the adjacent treadboard elements can be avoided, which would occur if the angle is not variable. The connection between the drive chain 5 and each treadboard element 4 may be obtained by another method. Namely, according to this method, while the arm 23 is connected to the associating treadboard element and the drive chain in the same manner as described above, the arm 24 having one end connected to the arm 23 has the other end set free. In this way, it is also possible to maintain the angle $\theta$ unchanged between the rectilinear section and semicircular section of the travelling path of drive chain. In this case, the free end of the arm 24 may be guided by, e.g. a rail. The use of the arms 23, 24, arranged in a V-shaped configuration, for supporting the treadboard element, enables the treadboard element to be guided and driven in a stable manner. As will be readily understood, the spherical bearing 25 is used for the connection between the arm 23 and the vertical rod 22 for the purpose of dealing with the angular change (usually 30 degrees) occurring between the drive chain 5 and arms 23, 24, and the treadboard element 4, when the treadboard element travels from the rectilinear sloped section to the horizontal section of the circulation path. A roller 27 is connected to the lower end of the vertical rod 22 through a short arm 28. This roller 27 is in engagement with guide rail 26, running along substantially the center line of the circulation path 1, to keep the treadboard element in a predetermined direction or sense positively. The angle or inclination in a vertical plane of the arm 28, carrying the roller 27 in engagement with the guide rail 26, varies in accordance with the angular change of the circulation path as the associating treadboard element travels from the rectilinear sloped section to the horizontal section or vice versa of the circulation path 1. However, since the roller 27 serves to maintain the associating treadboard element in a predetermined direction constantly in a manner to be described later, the arm 28 is always held in the same direction as the treadboard element even in the horizontal section as well as in the rectilinear sloped section, as shown in FIG. 1. That is to say that, in the horizontal sections of the circulation path, the arm is in a fixed relative position with respect to the vertical rod 22. Therefore, in the horizontal sections, 3, 3', the arm 28 causes the associating treadboard element to make a revolution on its vertical axis in the direction of the single arrow in FIG. 1, during its revolution around the center of the semicircular section of the path in the direction of the double arrow in FIG. 1 which is caused by the cooperation of the drive chain 5 and the arms 23, 24. Thus, the directional position of each treadboard element 4 remains unchanged during its travelling from the ascending rectilinear section 2 to the descending rectilinear section 2' of the circulation path. The arm 23 has a short arm 32 connected to that end thereof which is opposite to the drive chain 5, which arm 32 carries a roller 31. This roller 31 serves to support the treadboard element 4 while rolling on a rail 33. Each treadboard element 4 is provided with two front wheels 17, 17' arranged to roll on rails 19, 19' respectively, two rear wheels 18, 18' arranged to roll on rails 20, 20' respectively and a riser 21 covering the air space beneath the treadboard element 4. The rollers 17, 17' are provided on the outer faces thereof with guides 37, 37' which engage synthetic resin-made sliding plates 90, 90' respectively mounted to the inner faces of the rails 19, 19', so as to prevent lateral displacement of the treadboard element 4. Reference numeral 38 in FIG. 2 designates hand rails which are driven at the same speed as the treadboard elements 4. The shifting of the treadboard elements 4 from one rectlinear section to another in the horizontal sections of the path takes place under a comb plate 34, same as that used with ordinary escalator, or under a floor board 35 connected thereto.

Now, the construction of the drive chain 5 used in the present invention will be described in more detail with reference to FIGS. 5 to 8 hereunder.

Figure 5:
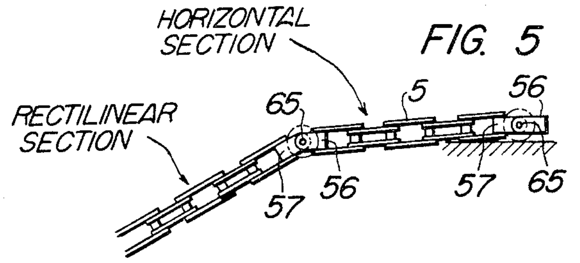
FIG. 5 is a fragmentary side view showing the operation of a drive chain.

As shown in FIG. 5, the drive chain 5 used in the invention is flexed vertically, normally through an angle of 30 degrees, as it moves from the rectilinear section to the horizontal section of its path. The drive chain is also required to be flexible in a horizontal plane for engagement with the sprocket 10 or 16 as shown in FIG. 6.

Figure 6:
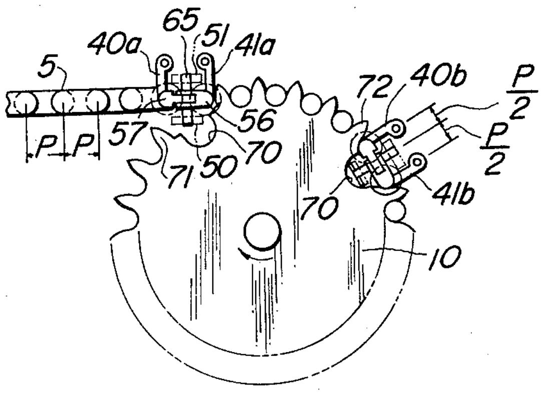
FIG. 6 is a fragmentary plan view showing the engagement between the drive chain and a sprocket.

For this purpose, the drive chain 5, as shown in FIGS. 5 and 6, has a plurality of sets of universal coupling links 56, 57 (hereinafter referred to as coupling links) incorporated therein, with a plurality of chain links located between adjacent sets, like the ordinary roller chain, said coupling links being pivotally coupled with each other by a pin 65. Thus, a group of chain links between adjacent pins 65 is pivotable about the respective pins in a vertical plane as an integral unit. Of course, the drive chain 5 is flexible in a horizontal plane when it is to be engaged with the sprocket 10 or 16. Each of the coupling links 56, 57 is in a length a half of that of the individual chain link. The sprocket 10 or 16 is formed with a plurality of notches 70 at locations corresponding to the teeth preceding teeth 71, 72 . . . as shown in FIG. 6. These notches 70 are provided for the engagement with guide rollers 50 respectively which are mounted to the respective pins 65. The aforementioned levers 40 and 41 are mounted to the coupling links 56 and 57 respectively.

Figure 3:
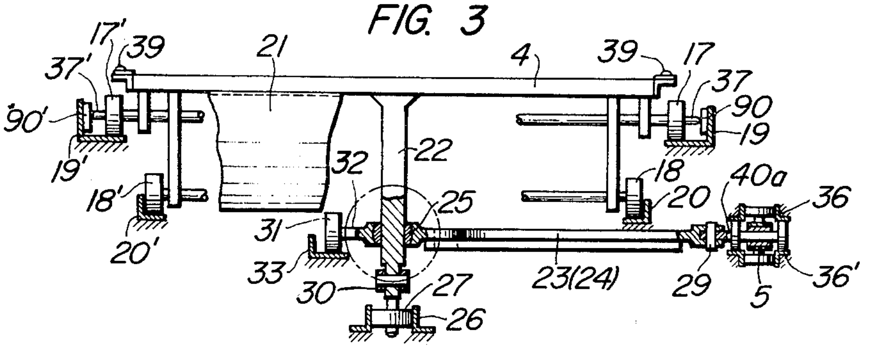
FIG. 3 is a front elevation, in enlargement, of one treadboard element and the parts associating therewith.
Figure 4:
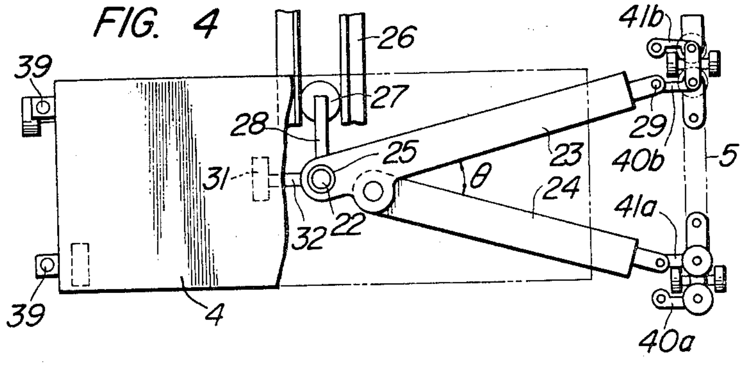
FIG. 4 is a plan view, partly broken away, of FIG. 3.
Figure 7:
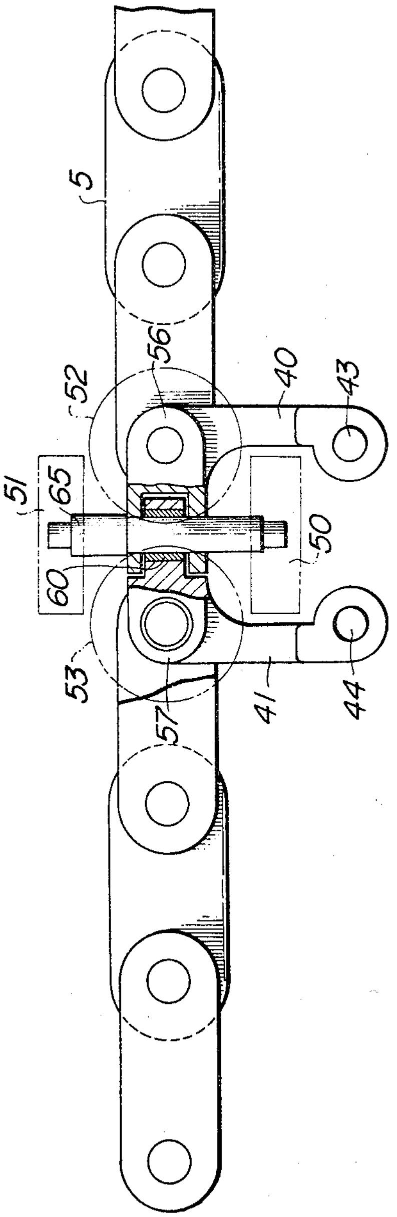
FIG. 7 is a fragmentary plan view, in enlargement and partly in section, of the drive chain.
Figure 8:
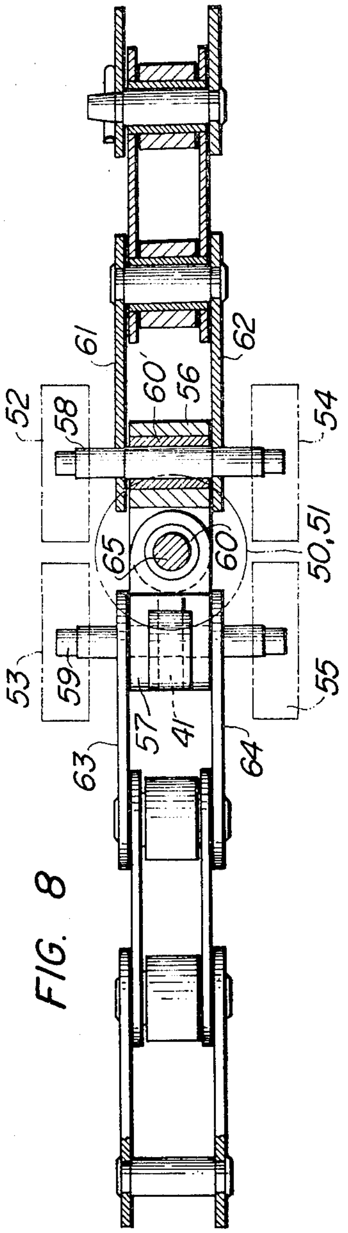
FIG. 8 is a fragmentary side view, in enlargement, of the drive chain.

FIGS. 7 and 8 show the drive chain in enlargement. As stated previously, the coupling links 56, 57 are pivotally connected to each other by means of the pin 65. The pin 65 has a bushing 60 fitted thereon and also has two rollers 50, 51 mounted to the opposite ends thereof which travel in contact with guide rails 36, 36' respectively, as shown in FIG. 3, during travelling of the drive chain 5 in the sloped sections of the circulation path 1, serving as guides for the chain.

On the other hand, the coupling links 56, 57 are coupled with the link plates 61, 62 and 63, 64 of adjacent chain links by pins 58, 59 respectively through the intermediary of a bushing 60'. The pins 58, 59 carry at the opposite ends thereof rollers 52, 53 and 54, 55 respectively, which travel in contact with the guide rails 36, 36' as shown in FIG. 3, to thereby prevent the drive chain 5 from running zigzag. In FIG. 7, reference numerals 43, 44 designate openings for receiving pins 29 by which the levers 40, 41 are pivotally connected to the arms 23, 24 respectively.

Owing to the arrangement described above, the chain 5 is freely flexible in a vertical direction as well as in a horizontal direction, ensuring smooth operation of the treadboard elements.

Figure 9:
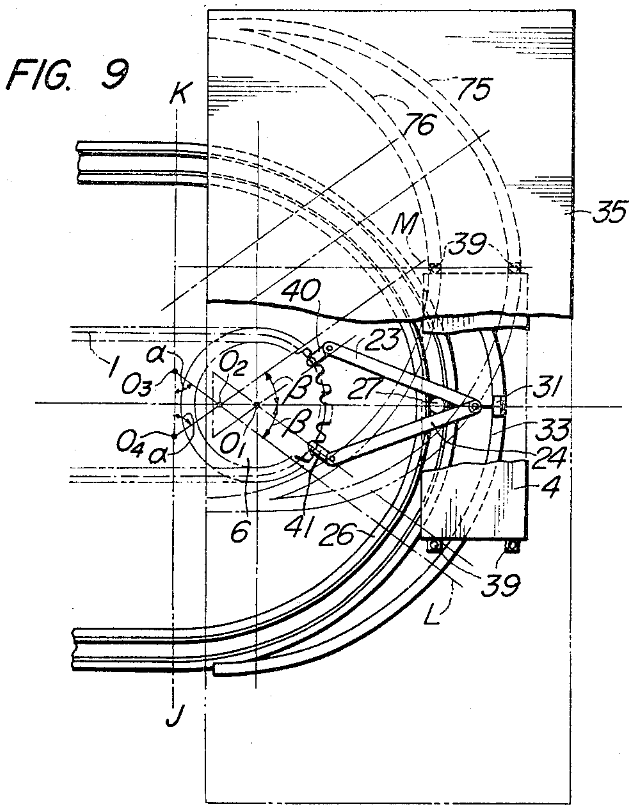
FIG. 9 is a fragmentary plan view, partly broken away, of the horizontal upper terminal portion of the escalator.

In FIG. 9, the guide rail 26 for guiding the guide rollers 27 of the respective treadboard elements 4 to effect movement of said treadboard elements in parallel relation, has a rectilinear configuration up to a point J on the rectilinear section of the treadboard circulation path, but has a complicated curved configuration in the horizontal section of said path from the point J to a point K opposite thereto. The curved configuration of the rail in this section is determined by the dimensions of the sprocket 10, levers 40, 41, and arms 23, 24. Machining of the guide rail having such a complicated curvature requires a complicated process involving great difficulties.

In order to avoid such difficulties, that portion of the guide rail 26 located in the horizontal section of the circulation path is, according to the present invention, composed of three arcuate sections connected to each other. Such a construction is satisfactory because, in the horizontal terminal section, the treadboard elements are not subjected to load and therefore they are not required to be precisely in parallel to each other, or in other words, it is permissible for the treadboard elements to rotate slightly about their vertical rods 22, in said section.

More practically, an angle $JO_3L$, i.e. $\alpha$, and an angle $LO_2M$, i.e. $2\beta$, are obtained on the premise that an arc concentric with the point $O_2$ which is determined geometrically and an arc concentric with the point $O_3$ which is also determined geometrically, are connected to each other. In this way, the guide rail 26 in the horizontal terminal section can be divided into three arcs consisting of an arc JL concentric with the point $O_3$, an arc LM concentric with the point $O_2$ and an arc KM concentric with the point $O_4$, so that the production of the guide rail 26 is rendered easy.

In the terminal section, the weight of each treadboard element is sustained by the roller 31 which is connected to the arm 32 common for the arms 23, 24 of said treadboard element, and the guide rail 33 for guiding this roller 31 may also be composed of three arcuate sections connected together into an approximately arcuate shape in the manner described.

Also, in the terminal section, the front and rear wheels of each treadboard element are suspended in air unsupportedly. In order to control the position of the treadboard element under such state, therefore, a plurality of guide members 39 are provided on respective cleats which are mounted to the treadboard element. These guide members 39 are guided by guide rails 75, 76 respectively.

Figure 10:
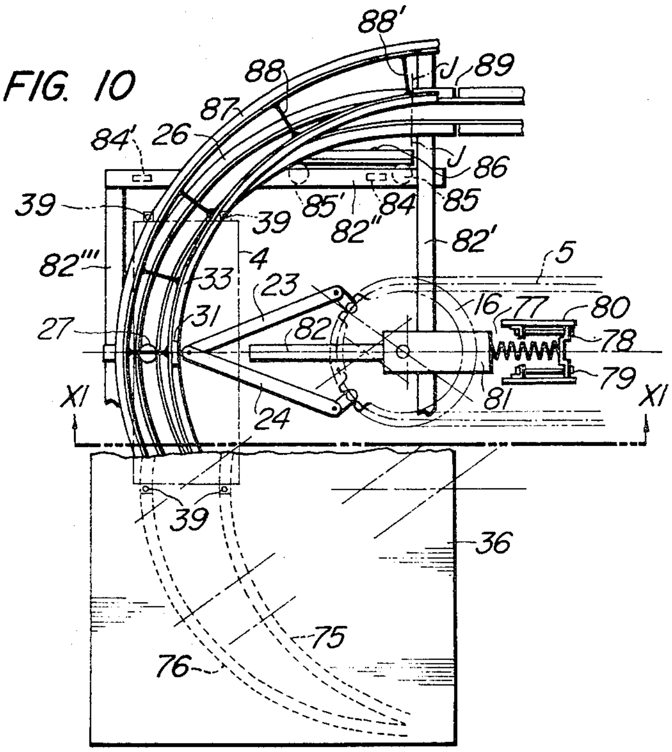
FIG. 10 is a fragmentary plan view, partly broken away, of the lower horizontal terminal portion of the escalator.
Figure 11:
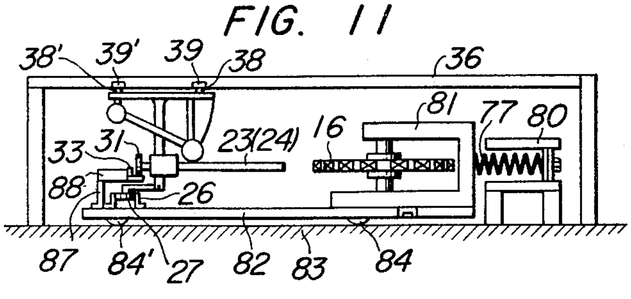
FIG. 11 is a side view taken on the line XI—XI of FIG. 10.

In the lower terminal section, on the other hand, the driven sprocket 16, guide rail 26 and guide rail 33 are mounted integrally on a common frame structure 82 which is provided with rollers 84, 84' so that said frame structure 82 may slide on a frame structure guide rail 83 smoothly, as shown in FIGS. 10 and 11. Such an arrangement is necessary for keeping the drive chain 5 in a tense condition by taking care of a change in length of the drive chain occurring during the travelling of said drive chain.

In more detail, the sprocket 16 is mounted in a substantially U-shaped bearing box 81 which in turn is mounted on a frame structure composed of members 82, 82', 82'' and 82''', integrally arranged on one plane. The frame structure is provided, for example, with rollers 84, 84' at the underside of the members 82'', so that the frame structure is movable smoothly on the frame structure guide rail 83.

The frame members 82'' are also provided with lateral rollers 85, 85' respectively, in symmetrical relation to each other with respect to the axis of the sprocket, for the purpose of maintaining the lateral position of the sprocket 16, said rollers 85, 85' being arranged to roll on respective guide rails 86 which are secured to the machine frame.

The guide rails 26 and 33 are integrally mounted on the frame structure. In order to enable the guide rails 33 and 26 to cross each other one over another in the lower terminal section, the guide rail 33 is, for example, welded to a plurality of supporting members 88, 88' . . . which are welded to a curved L-shaped member 87 at an interval.

The bearing box 81 is urged outwardly by a spring 77 so as to give a tension to the drive chain 5. The spring 77 is mounted in a bracket 80 with one end bearing against a spring seat 78 which is in slidable engagement with rod members 79, so that the stroke of the spring is adjustable by slidably displacing the spring seat on said rod members 79.

In the tension adjusting mechanism described above, it is necessary to arrange the spring 77 such that the axis thereof is located above the plane of engagement between the sprocket 16 and the drive chain 5, to thereby prevent said sprocket from falling down under the tension of the drive chain.

Although, in the embodiment described hereinabove, the tensioning device for the drive chain 5 is provided in the lower terminal section, such tensioning device may alternatively be provided in the upper terminal section to achieve the same purpose. In this case, however, it is preferable to provide the drive means for the treadboard elements in the lower terminal section or to drive the treadboard elements by means which is provided separately, e.g. by drive means to be described later in another embodiment.

Figure 12:
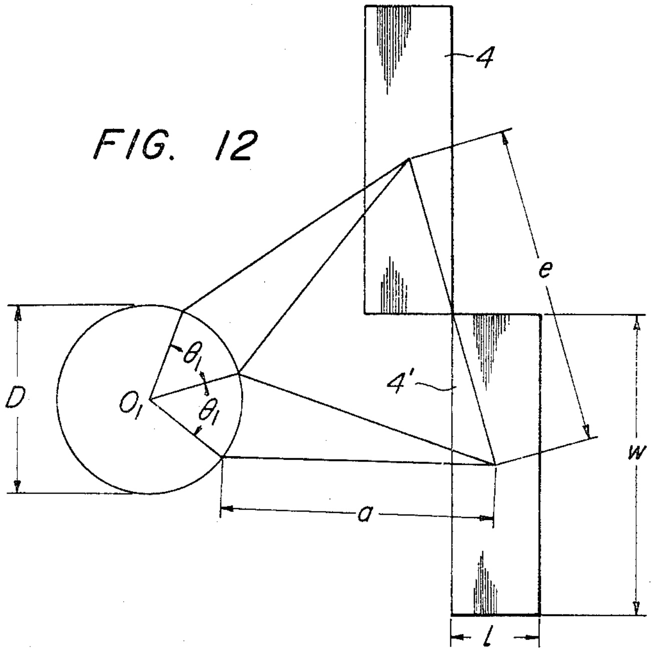
FIG. 12 is a diagrammatic plan view showing adjacent treadboard elements in the positions closest to each other in the horizontal terminal portion of the escalator.

Next, the manner in which the minimum lengths of the arms 23, 24 are determined to avoid collision of adjacent treadboard elements in the upper horizontal section of the circulation path, will be explained with reference to FIG. 12 which shows the adjacent treadboard elements in the closest positions to each other in the horizontal semicircular section of the path.

When the diameter of the sprocket 10 is represented by D, the longitudinal width of the treadboard elements 4, 4′ by $l$, the lateral width of the same by $w$, the distance between the centers of the treadboard elements 4, 4′ in the closest positions to each other as shown by $e$, and the angle formed by the lines connecting the joints between the chain 5 and the arms 23, 24 with the center $O_1$ of the sprocket 10 by $\theta_1$, the lengths $a$ of the ams 23, 24 are obtained from the following formula:

$$a=\sqrt{\frac{D^2}{4}+\frac{e^2}{4\sin^2\frac{\theta_1}{2}}-\frac{D\cdot e}{2}\cot\frac{\theta_1}{2}}$$

where $e=\sqrt{l^2+w^2}$

The collision between the adjacent treadboard elements 4, 4′ can be avoided by selecting the lengths of the arms 23, 24 to be one which are obtained from the above formula.

Figure 2:
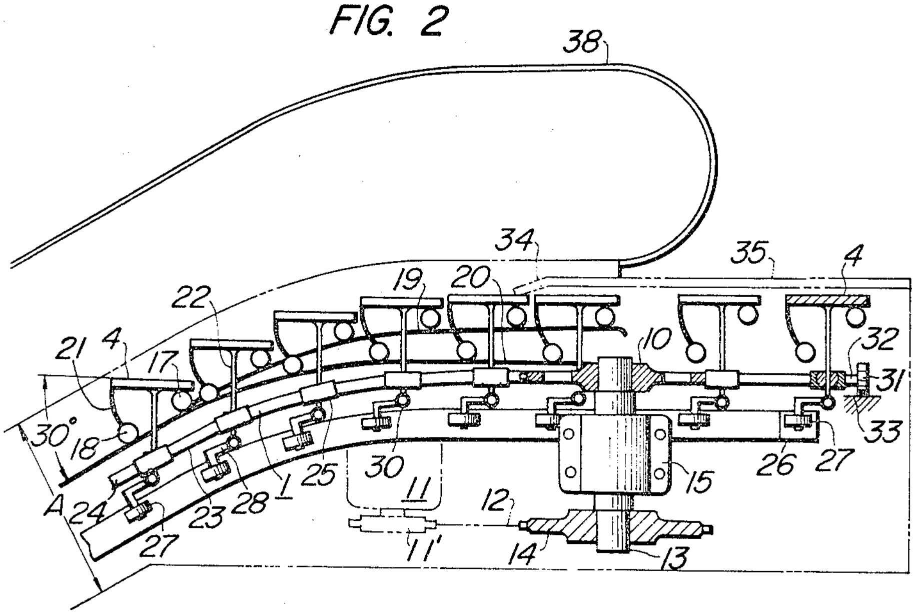
FIG. 2 is a fragmentary side view taken on the line II—II of FIG. 1, showing the upper portion of the escalator where driving means is provided.

In operation, as may be seen from FIG. 2, the drive from the prime mover 11 is transmitted to the sprocket 10 through a sprocket 11′ operatively connected directly to the prime mover 11, a chain 12 engaging around said sprocket 11′ and a sprocket 14 mounted on a main shaft 13 journaled in a bearing 15, to drive the chain 5, whereby the treadboard elements are circulated along the circulation path.

In the embodiment described hereinabove, the drive chain 5 is used for guiding as well as for driving the treadboard elements. However, when separate means is used for driving the treadboard elements, as in another embodiment to be described hereunder, the drive chain 5 is only required to guide the treadboard elements. Further, when the separate means is used for driving the treadboard elements, the arms 23, 24 are subjected to so small a load that only one arm will well suffice the purpose.

Now, another embodiment will be described hereunder with reference to FIGS. 13 to 19.

Figures 16, 17, 18, 19:
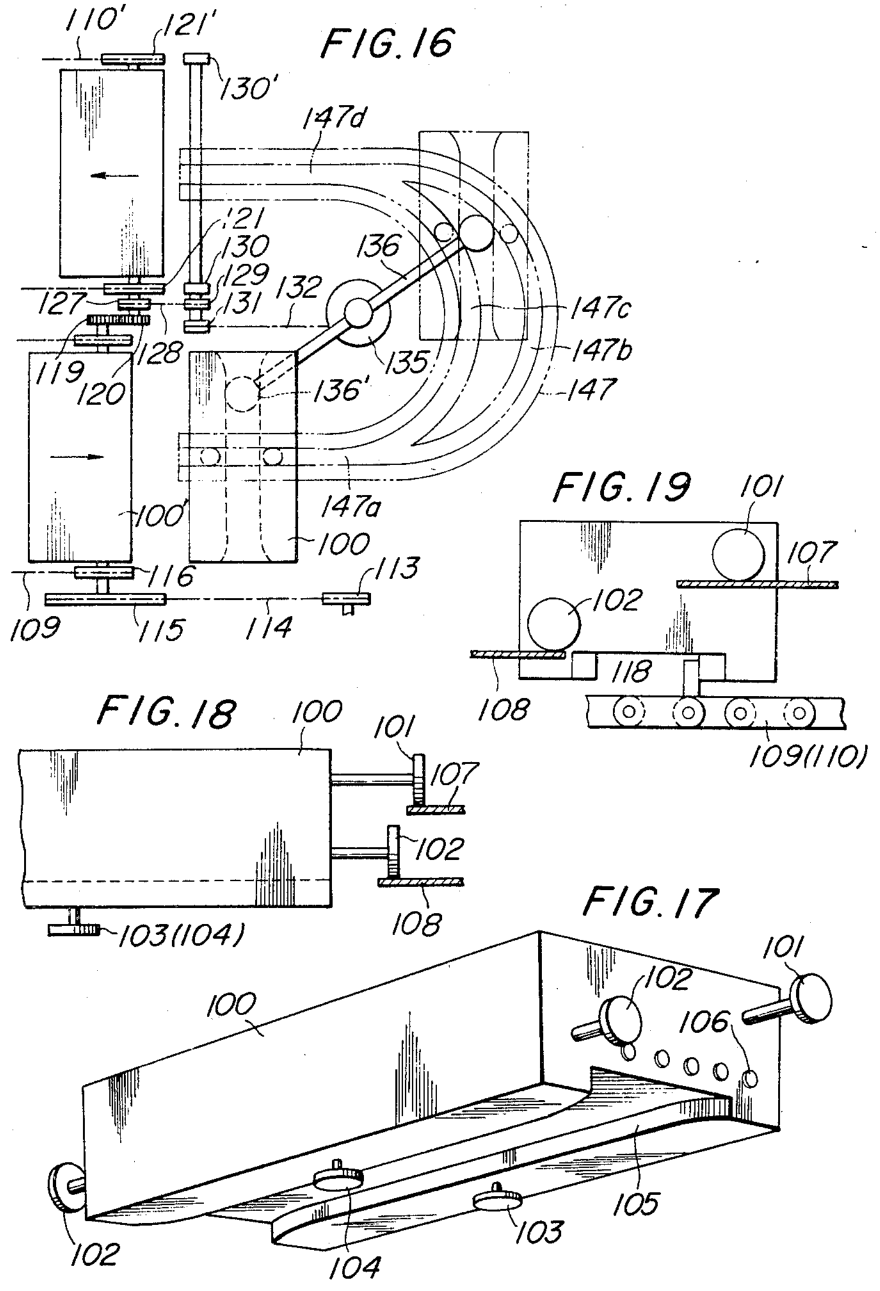

In this embodiment, as shown in FIG. 17, each treadboard element 100 has a box-shaped configuration and is provided on both sides thereof with front wheels 101 and rear wheels 102, as in the preceding embodiment, for engagement with guide rails 107, 108 respectively. Also provided on both sides of each treadboard element are a series of pins 106 which are adapted to engage timing gears 130, 140 shown in FIG. 15. The treadboard element 100 is also provided on the underside thereof with rollers 103, 104 which are adapted to engage guide rail member 147 in the horizontal section of the circulation path, so as to maintain said treadboard element in the same direction in both the ascending section and descending section of the path. The treadboard element also has a groove 105 formed in the underside thereof as shown.

Drive chains 109, 109′ for carrying the treadboard elements upwardly are engaged around driving sprockets 116, 116′ and driven sprockets 117, 117′ respectively. The driving sprockets 116, 116′ are driven by a motor 111 through a reduction gearing 112, a sprocket 113 operatively connected directly to said reduction gearing, a chain 114 and a sprocket 115. The drive chains 109, 109′ are connected together by a plurality of hook members 118 which are arranged in parallel to each other at the same interval as the treadboard elements and which carry the treadboard elements by engagement with the grooves 105 formed in the underside of the respective treadboard elements. On the other hand, drive chains 110, 110′ for carrying the treadboard elements downwardly, are engaged around driving sprockets 121, 121′ and driven sprockets 122, 122′ respectively. The driving sprockets 121, 121′ are driven through a gear 119, which is connected coaxially to the aforementioned driving sprocket 116′, and a gear 120 in engagement with said gear 119. Similar to the driven chains 109, 109′ for the upward movement, the drive chains 110, 110′ also carry a plurality of hook members 123 mounted therebetween for engagement with the grooves 105 of the respective treadboard elements. Reference numerals 124, 125 . . . 126 in FIG. 14 designate sprockets for guiding the drive chains 109, 109′.

Figure 13:
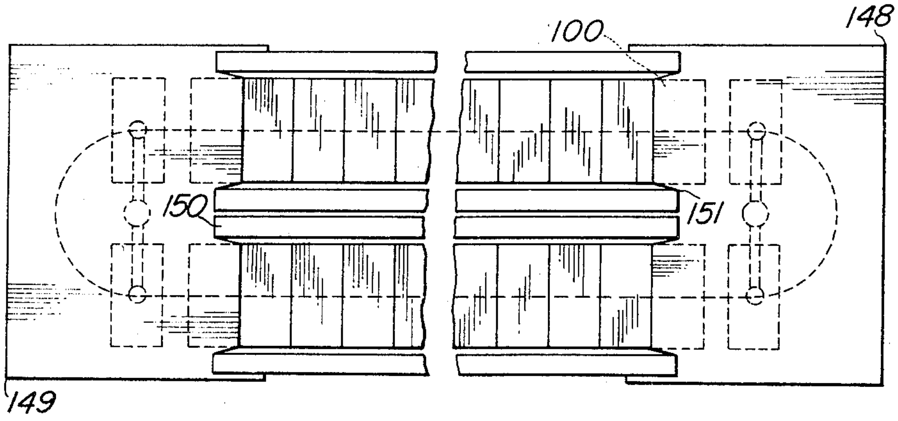
Figure 14:
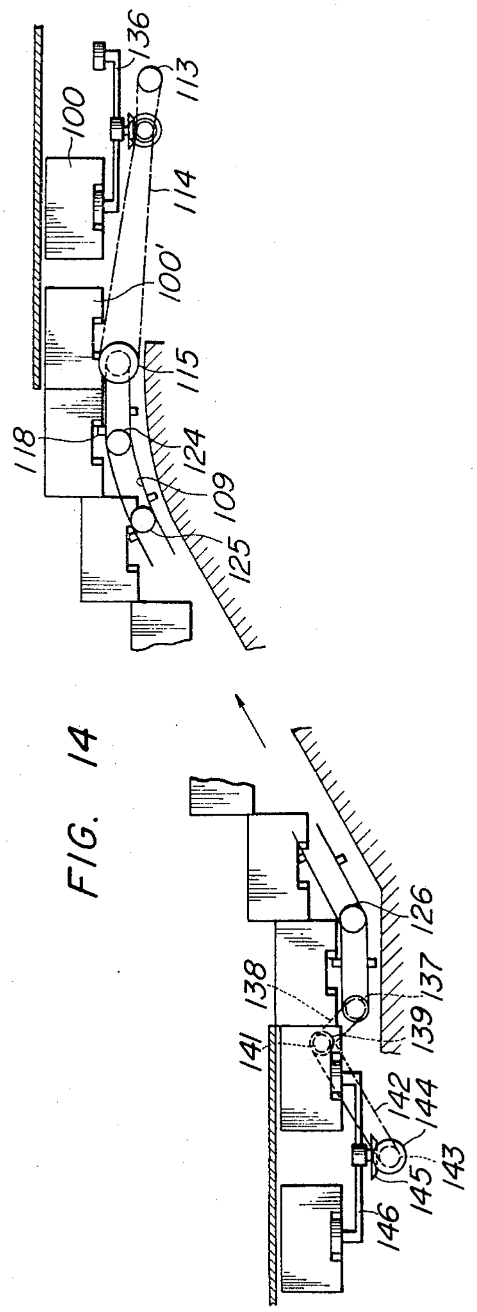
Figure 15:
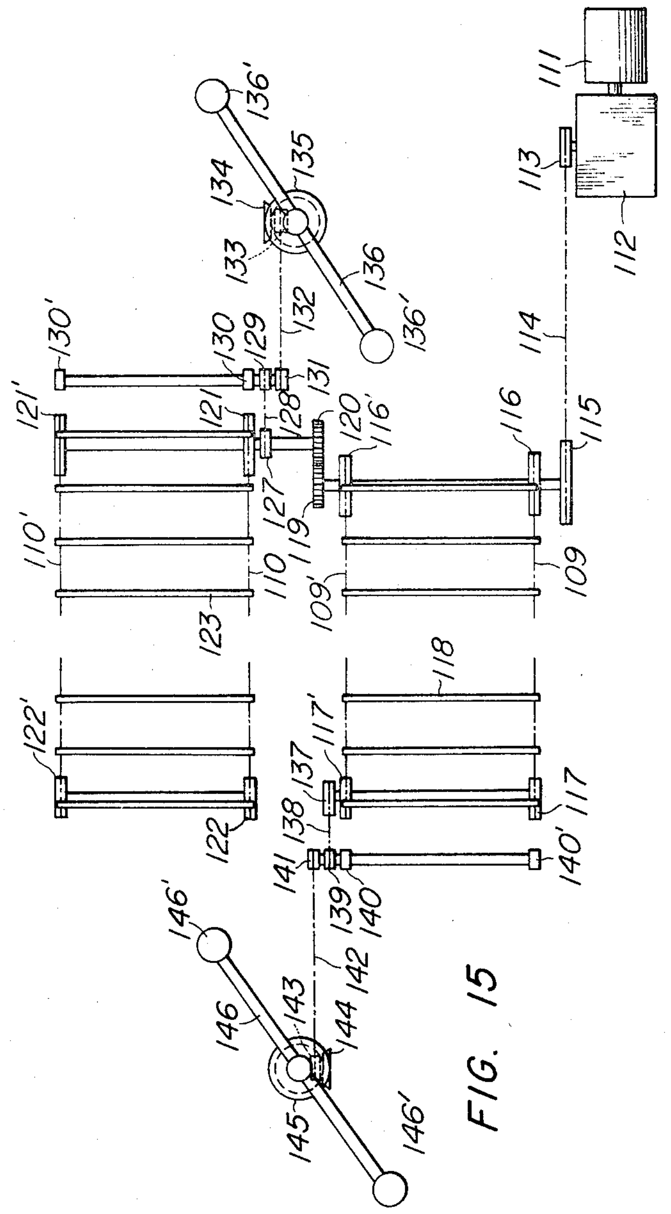

In the upper horizontal section, there is provided a rotary arm 136. This rotary arm 136 is driven by the drive from the motor 111 transmitted thereto through the sprocket 120, a sprocket 127 coaxial with said sprocket 120, a sprocket 129 coaxial with the aforementioned timing gears 130, 130′ and driven by said sprocket 127 through a chain 128, a sprocket 131, a sprocket 133 driven by said sprocket 131 through a chain 132 and bevel gears 134, 135. On the other hand, a rotary arm 146 is provided in the lower horizontal section, which is also driven by the drive from motor 111 transmitted thereto through the aforementioned driven sprocket 117′, a sprocket 137 coaxial with said sprocket 117′ a sprocket 138 coaxial with timing gears 140, 140′ and operatively connected to said sprocket 137 through a chain 138, a sprocket 141 coaxial with said sprocket 139, a sprocket 143 operatively connected to said sprocket 141 through a chain 142 and bevel gears 144, 145. In FIG. 13, reference numerals 148, 149 designate loading and unloading plates provided at the upper and lower horizontal section respectively, while 150, 151 designate hand rails for the ascending and descending paths respectively, which are driven at the same speed as the treadboard elements.

In operating the escalator of this embodiment, the treadboard element 100 having been carried up by the drive chains on the ascending side is pushed forward by the succeeding treadboard element to have its guide rollers 103, 104 brought into engagement with the straight portion 147*a* of the groove in the guide rail 147. Then, a roller 136′ at the end extremity of the synchronous shifting arm 136 comes into engagement with the groove 105 in the underside of the treadboard element 100, whereby said treadboard element is shifted from the ascending side to the descending side, with the rollers, 103, 104 sliding in curved grooves 147*b*, 147*c* of the guide rail 147, and then in the straight groove 147*d*. The plurality of pins 106 provided on both sides of the treadboard element come into engagement with the timing gears 130, 130′ on the descending side, whereby the treadboard element 100 is placed on the chains 110, 110′ on the descending side to be carried downwardly thereby. Upon reaching the lower end of the descending side, the treadboard element 100 is shifted from the descending side to the ascending side by the action of the synchronous shifting arm 146 and is carried up again by the chains 109, 109' on the ascending side. In the manner described, the treadboard element 100 is continuously carried upwardly and downwardly along the circulation path by the chains 109, 109' and 110, 110', and thus an ascending and descending escalator are provided side-by-side by the single system.

In describing the operation of the chains 109 and 110 in further detail, each of the treadboard elements is carried upwardly and downwardly by the hook members 118 and 123, provided across the respective chains and being in engagement with the groove 105 formed in the underside of each treadboard element. In this case, the movement of each treadboard element is guided by the guide rails 107, 108 running on both sides of the row of treadboard elements, which are in engagement with the rollers 101, 102 respectively mounted to both sides of the treadboard element.

In this embodiment, the treadboard element shifting device comprises the shifting arm which is operated by the drive system for the escalator in synchronized relation to the drive chains 109 and 110, and the timing gears which are operated by the same drive system to get the treadboard elements on the respective drive chains. However, the timing gears may be eliminated where the component of the velocity, at which the treadboard element is released from the arm 136 or 146 towards the chain, is synchronous with the velocity of the chain, because the timing is determined by the relationship between the rate of rotation of the arm 136 or 146 and the speed of the chain carrying the treadboard elements.

What is claimed is:

1. A planar reciprocation type conveying means comprising a series of treadboard elements to be circulated in a circulation path comprised of two rectilinear sections bridging over two spaced points and semicircular horizontal sections connecting said rectilinear sections with each other at both the ends thereof, said treadboard elements being arranged in adjoining relation to each other with substantially no gap between adjacent ones in said rectilinear sections of the circulation path, drive means to drive said series of treadboard elements for circulation in said path, and position control means provided at each of said semicircular sections of the circulation path to maintain the directional position of each treadboard element being shifted from one rectilinear section to another in said horizontal sections constant.

2. A planar reciprocation type escalator according to claim 1 wherein the circulation path consists of two parallel rectilinear sloped sections bridging over spaced floors in a building and semicircular horizontal sections connecting said rectilinear sections with each other at both the upper and lower ends thereof under the floor boards of the respective floors and said position control means provided at each of said horizontal sections of the circulation path to maintain the directional position of each treadboard element being shifted from one rectilinear section to another in said horizontal sections constant by causing said treadboard element to revolve about the center of said semicircular section and on its axis.

3. A planar reciprocation type escalator according to claim 2, further comprising means to effect quick shifting of the treadboard elements in each of the horizontal sections so as to enable said treadboard elements to be arranged in adjoining relation to each other with substantially no gap between adjacent ones in the following rectilinear section.

4. A planar reciprocation type escalator according to claim 2 wherein each of said treadboard elements is connected to an endless chain by a connecting member and said endless chain is engaged around sprockets provided inside of the upper and lower horizontal sections of the circulation path respectively.

5. A planar reciprocation type escalator according to claim 4, in which each of the treadboard elements is pivotally connected to the connecting member and said connecting member is composed of arms connected to each other in a V-shaped configuration.

6. A planar reciprocation type escalator according to claim 4, in which said connecting member and the associating treadboard element are connected to each other by means of a universal joint so as to allow angular change of said treadboard element with respect to the circulation path in a vertical plane during travelling of said treadboard element from the rectilinear sloped section to the horizontal section or vice versa of the circulation path and free rotation of the treadboard element in a horizontal plane during traveling of the treadboard element in the semicircular horizontal sections of said path.

7. A planar reciprocation type escalator according to claim 4, in which said endless chain is flexible horizontally as well as vertically.

8. An endless chain suitable for a planar reciprocation type escalator set forth in claim 7, which is flexible horizontally as well as vertically and is provided with support levers 40, 41 for carrying the connecting member by way of which said chain is connected to each treadboard element.

9. A chain as set forth in claim 8, which is provided with a plurality of sets of coupling links 56, 57 constituting parts thereof, said coupling links being pivotally connected to each other by means of a pin 65 so as to be flexible vertically, said pin extending through said links through the intermediary of a bushing 60 at right angles to link rollers.

10. A chain as set forth in claim 8, in which said pin extending perpendicularly of the link rollers carries rollers 50, 51 mounted to both ends thereof which rollers serve as guides during travelling of the treadboard elements in the rectilinear sections of the circulation path.

11. A chain as set forth in claim 8, which is provided with a plurality of sets of coupling links 56, 57 coupled with adjacent link plates 61, 62 and 63, 64 by pins 58, 59 respectively, through the intermediary of a bushing 60', each of said pins carrying at both ends thereof rollers 52, 53 or rollers 54, 55 to prevent the chain from travelling zigzag.

12. An escalator according to claim 2, in which said position control means comprises means provided with each treadboard element and a guide provided in the horizontal section of the circulation path, said means and said guide cooperating with each other to maintain the associating treadboard element in a constant position during its travelling in said horizontal section.

13. An escalator according to claim 12, in which said means is provided below each treadboard element and is mounted to a vertical rod 22 extending downwardly from the backside of said treadboard element, and cooperating with the guide provided in the horizontal sections of the circulation path to maintain the position of the treadboard element constant during travelling in said horizontal section; an arm 28 is connected to the lower end of said vertical rod in a manner such that it is pivotable only vertically to deal with an angular variation between the horizonal section and sloped section of the circulation path and thereby to maintain the associating treadboard element in a constant position; and said arm 28 carries at its free end a roller 27 and a rail 26 is provided in the rectilinear sections and horizontal sections of the circulation path for guiding said roller 27.

14. A guide rail as set forth in claim 13, in which that portion of said guide rail located in the horizontal section of the circulation path is composed of three arcuate members connected to each other into an approximately arcuate configuration.

15. A planar reciprocation type escalator according to claim 2, in which a plurality of guide members 39 are provided with each treadboard element, and guide rails 75, 76 are provided on the underside of a loading and unloading plate 35 for guiding said members.

16. A planar reciprocation type escalator according to claim 4, which further comprises guide rails 26, 33 for guiding treadboard elements at one of the horizontal sections of the circulation path, a frame structure 82 to support the sprocket and the guide rails thereon so as to be slidably movable in a rectilinear direction as a unit, and means to bias said frame structure 82 outwardly rectilinearly thereof.

17. A planar reciprocation type escalator according to claim 4, in which each treadboard element is provided with a vertical rod thereunder and the connecting member comprises arms 23, 24 having one end connected to the chain and the other end connected to the vertical rod extending downwardly from substantially the center of each treadboard element, the length $a$ of said arms being represented by the formula:

$$a=\sqrt{\frac{D^2}{4}+\frac{e^2}{4\sin^2\frac{\theta_1}{2}}-\frac{D\cdot e}{2}\cot\frac{\theta_1}{2}}$$

$$(e=\sqrt{l^2+w^2})$$

wherein D is the diameter of the sprocket, $w$ is the lateral width of the treadboard element, $l$ is the longitudinal length of the treadboard element, $e$ is the distance between the centers of the adjacent treadboard elements in the closest positions to each other and $\theta$ is the angle formed by the lines connecting the joints between the chain 5 and arms composing the connecting member with the center $O_1$ of the sprocket.

18. An escalator according to claim 4, further comprising means to prevent lateral displacement of a planar reciprocation type escalator comprising guides 37, 37' provided on the opposite side walls of each treadboard element and sliding plates 90, 90' provided in opposed relation to said respective guides for engagement therewith.

19. A planar reciprocation type escalator comprising a series of treadboard elements to be circulated in a circulation path consisting of two parallel rectilinear sloped sections bridging over spaced floors in a building and semicircular horizontal sections connecting said rectilinear sections with each other at both the upper and lower ends thereof under the floor boards of the respective floors, said treadboard elements being arranged in adjoining relation to each other with substantially no gap between adjacent ones in said rectilinear sections of the circulation path and carrying an objective article only in said sections from one floor to another; guide means comprising means provided at said respective rectilinear sections of the circulation path for carrying the treadboard elements upwardly and downwardly, an endless chain engaged around sprockets provided inside of said circulation path to travel along said path and connecting members for connecting said chain to the respective treadboard elements; and means provided at the horizontal sections of the circulation path to maintain the position of the treadboard elements constant during shifting of said treadboard elements from one rectilinear section to another at the horizontal sections of the circulation path.

20. An escalator according to claim 1, in which the drive means drives only the treadboard elements in the rectilinear sections of the circulation path.

21. A planar reciprocation type escalator comprising a series of treadboard elements to be circulated in a circulation path consisting of two parallel rectilinear sloped sections bridging over spaced floors in a building and semicircular horizontal sections connecting said rectilinear sections with each other at both the upper and lower ends thereof under the floorboards of the respective floors, said treadboard elements being arranged in adjoining relation to each other with substantially no gap between adjacent ones in said rectilinear sections of the circulation path and carrying an objective article only in said sections from one floor to another, means provided at said respective rectilinear sections of the circulation path for carrying the treadboard elements upwardly and downwardly and treadboard element, shifting means provided at said respective horizontal sections of the circulation path and operated synchronously with the travelling speed of the treadboard elements in the rectilinear sections to shift the treadboard elements from one rectilinear section to another without changing the position thereof.

22. An escalator according to claim 21, in which treadboard element shifting means comprises arms 136, 137 rotatably operated synchronously with the traveling speed of the treadboard elements in the rectilinear sections of the circulation path and adapted to shift the treadboard elements from one rectilinear section to another by engagement therewith.

23. An escalator according to claim 2, in which the position control means comprises guides 103, 104 provided at the central portion on the backside of each treadboard element in a fore-and-aft relation and a guide rail 147 provided at each of the horizontal sections of the circulation path for engagement with said guides, whereby the position of the treadboard elements being shifted at the respective horizontal sections is maintained constant.

24. A planar reciprocation type escalator comprising a series of treadboard elements each having a first edge portion and a second edge portion and a riser provided at the second edge portion thereof extending vertically therefrom and the first edge portion of each treadboard element in the first rectilinear section adjoins slidably to the riser of the preceding treadboard element; and means for circulating said series of treadboard elements in a circulation path that consists of first and second rectilinear sections running in side-by-side relation on a sloped plane and curved sections connecting the first and second rectilinear sections, wherein said circulating means further comprises driving means to drive the treadboard elements for circulation by successively shifting the treadboard elements from the first rectilinear section to the second rectilinear section through the respective curved section and vice versa and control means positioned at the curved section for controlling the position of each treadboard element so that the first edge portion of each treadboard element adjoins slidably to the riser of either the preceding or succeeding treadboard element according to either the first or second rectilinear sections.

References Cited

UNITED STATES PATENTS 888,949 5/1908 Wheeler ------------ 198—17

EDWARD A. SROKA, Primary Examiner

U.S. Cl. X.R.

104—25